UNITED STATES PATENT OFFICE.

PASCAL MARINO, OF LONDON, ENGLAND.

MANUFACTURE OF ELECTRICAL ACCUMULATORS.

1,068,439.

Specification of Letters Patent.

Patented July 29, 1913.

No Drawing.

Application filed August 9, 1912. Serial No. 713,166.

*To all whom it may concern:*

Be it known that I, PASCAL MARINO, a subject of the King of Italy, and resident of 129 Albert street, Regent's Park, London, England, have invented certain new and useful Improvements in the Manufacture of Electrical Accumulators, of which the following is a specification.

This invention relates to aluminium grids or supports for the electrodes of electrical accumulators or secondary batteries of the "pasted electrode" type.

The invention consists in an improved process of covering the grids or supports (previous to the pasting operation) with an acid-resisting and electrically conductive composition adapted to effectually preserve the grid from the destructive action of the electrolyte and prevent the production of local chemical actions and the formation of electric couples between the active material and the grid or support. The grids thus coated serve as conductors for distributing the current throughout the mass of the active material and as they are much lighter than the lead grids or supports usually employed, the weight of the accumulator is correspondingly reduced without detrimentally affecting its electrical capacity.

According to this invention the grids or supports are first coated with a composition containing lead oleate dissolved either in turpentine, benzol or carbon bisulfid, and a carbon-containing organic body or bodies (fats, rosins, oils), then heated to a dull red heat, and finally coated with a composition containing acid resisting materials, as for example gutta percha, indiarubber and Syrian asphaltum (melted under the action of heat in a drying oil) and impalpable lead powder.

The first composition is prepared by dissolving lead oleate in a sufficient quantity of turpentine, benzol or carbon bisulfid to form a semi-fluid solution, and then adding to said solution an amount of the carbon-containing organic bodies equal to the amount of lead oleate employed. The composition may conveniently be applied to the aluminium grids by means of a brush, the grids being afterward heated to a dull-red heat which destroys the organic bodies leaving a hard firmly adherent and acid-resisting film of very finely divided carbon on the surface of the grid, the lead present melting on the film and becoming integral therewith. The aluminium grids thus prepared are then coated previous to the pasting operation (either by immersion, by a brush, or other convenient means) with the second composition which is prepared by heating and melting equal parts of gutta percha and indiarubber, with Syrian asphaltum (in the proportion of 8% of the weight of the gutta percha and indiarubber) in a drying oil, such as linseed oil, nut oil, hempseed oil or poppy seed oil and continuously stirring the mixture. As soon as the mixture becomes fluid impalpable lead powder is gradually added to it until the mixture acquires the consistency of a syrup. The composition, when still warm, is then applied to the grid which should be slightly heated before the composition is applied. When dry, the composition forms an adherent, electrically conductive and acid-resisting sheath completely enveloping the aluminium grid which may be repeatedly bent without damaging the sheath.

Instead of employing heat for dissolving the solid ingredients, a solvent such as benzin or carbon bisulfid may be employed for the purpose. The composition thus obtained is not however so strongly adherent as it is when heat is employed and forms a pellicular-like coating which may be easily removed from the surfaces of the grid.

I claim:

1. The improved process of coating aluminium grids or supports for electrical accumulators with an acid-resisting and electrically conductive composition, which consists in first coating the grids or supports with a composition containing lead oleate dissolved in a suitable solvent, and a carbon-containing body or bodies, then heating the grids or supports to a dull-red heat, and finally coating the grids or supports with a composition containing gutta percha, indiarubber, Syrian asphaltum and impalpable lead powder, substantially as and for the purpose described.

2. The herein described process of treating a metallic grid for electrical accumulators, which consists in first coating said grid with a solution containing lead oleate, to which solution a carbon containing substance has been added, then heating the grid to a dull red heat, and finally coating the thus treated grid with a composition containing an acid resisting material and impalpable lead powder.

3. An electrical accumulator grid comprising a metallic base, a coating thereon of lead and finely divided carbon, and superposed upon said coating, a second coating of an acid resisting, electrically conductive substance.

PASCAL MARINO.

Witnesses:
 BERTRAM BEW,
 WILLIAM DAVIES.